US008473293B1

(12) United States Patent
Mengibar et al.

(10) Patent No.: US 8,473,293 B1
(45) Date of Patent: Jun. 25, 2013

(54) DICTIONARY FILTERING USING MARKET DATA

(71) Applicant: Google Inc., Mountain View, CA (US)

(72) Inventors: Pedro J. Mengibar, Jersey City, NJ (US); Jeffrey S. Sorensen, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/658,139

(22) Filed: Oct. 23, 2012

Related U.S. Application Data (60) Provisional application No. 61/625,523, filed on Apr. 17, 2012.

(51) Int. Cl.
*G06F 17/21* (2006.01)
*G10L 15/06* (2006.01)

(52) U.S. Cl.
USPC .............................. 704/243; 704/10; 704/244

(58) Field of Classification Search
USPC ........................................... 704/10, 243–244
See application file for complete search history.

(56) References Cited

U.S. PATENT DOCUMENTS

| | | | | |
|---|---|---|---|---|
| 4,829,577 A * | 5/1989 | Kuroda et al. | ................. | 704/244 |
| 5,125,022 A * | 6/1992 | Hunt et al. | ................. | 379/88.02 |
| 5,129,001 A * | 7/1992 | Bahl et al. | ...................... | 704/251 |
| 5,293,451 A * | 3/1994 | Brown et al. | ................. | 704/245 |
| 5,625,748 A * | 4/1997 | McDonough et al. | ........ | 704/251 |
| 6,195,634 B1 * | 2/2001 | Dudemaine et al. | .......... | 704/231 |
| 6,523,061 B1 * | 2/2003 | Halverson et al. | ............ | 709/202 |
| 6,633,846 B1 * | 10/2003 | Bennett et al. | ................. | 704/257 |
| 6,920,419 B2 * | 7/2005 | Kitamura et al. | .................. | 704/2 |
| 7,065,483 B2 * | 6/2006 | Decary et al. | ..................... | 704/7 |
| 7,181,395 B1 * | 2/2007 | Deligne et al. | ................. | 704/249 |
| 7,269,544 B2 * | 9/2007 | Simske | ............... | 704/4 |
| 7,467,087 B1 * | 12/2008 | Gillick et al. | ................. | 704/260 |
| 7,580,838 B2 * | 8/2009 | Divay et al. | ................... | 704/257 |
| 7,653,531 B2 * | 1/2010 | Sneddon et al. | ................. | 704/10 |
| 7,809,562 B2 * | 10/2010 | Hanazawa | .................... | 704/246 |
| 7,848,918 B2 * | 12/2010 | Li et al. | ............. | 704/9 |
| 7,908,279 B1 * | 3/2011 | Thirumalai et al. | .......... | 707/749 |
| 7,953,598 B2 * | 5/2011 | Brown | ......................... | 704/240 |
| 8,209,171 B2 * | 6/2012 | Abbott et al. | ................. | 704/235 |
| 8,219,384 B2 * | 7/2012 | Lloyd et al. | ..................... | 704/8 |
| 2003/0004716 A1 * | 1/2003 | Haigh et al. | .................. | 704/238 |
| 2003/0037053 A1 * | 2/2003 | Wang et al. | .................... | 707/100 |
| 2004/0015342 A1 * | 1/2004 | Garst | ................................ | 704/5 |
| 2004/0034524 A1 * | 2/2004 | Rajput et al. | ...................... | 704/9 |
| 2004/0138881 A1 * | 7/2004 | Divay et al. | ................... | 704/231 |
| 2004/0210438 A1 * | 10/2004 | Gillick et al. | ................. | 704/254 |
| 2005/0128181 A1 * | 6/2005 | Wang et al. | ................... | 345/156 |
| 2007/0027693 A1 * | 2/2007 | Hanazawa | .................... | 704/275 |

(Continued)

*Primary Examiner* — Eric Yen
(74) *Attorney, Agent, or Firm* — Fish & Richardson P.C.

(57) ABSTRACT

This specification describes technologies relating to system, methods, and articles for updating a speech recognition dictionary based on, at least in part, both search query and market data metrics. In general, one innovative aspect of the subject matter described in this specification can be embodied in a method comprising (i) identifying a candidate term for possible inclusion in a speech recognition dictionary, (ii) identifying at least one search query metric associated with the identified candidate term, (iii) identifying at least one market data metric associated with the identified candidate term, and (iv) generating a candidate term score for the identified candidate term based, at least in part, on a weighted combination of the at least one identified search query metric and the at least one identified market data metric.

20 Claims, 3 Drawing Sheets

U.S. PATENT DOCUMENTS

2007/0124147 A1* 5/2007 Gopinath et al. ............. 704/257
2008/0243834 A1* 10/2008 Rieman et al. .................... 707/5
2009/0157404 A1* 6/2009 Brown .......................... 704/257
2009/0199092 A1* 8/2009 Ghassabian ................... 715/261

* cited by examiner

DICTIONARY FILTERING USING MARKET DATA

PRIORITY CLAIM

This application claims the benefit, under 35 USC §119(e), of U.S. Patent Application Ser. No. 61/625,523, entitled "Dictionary Filtering Using Market Data," filed on Apr. 17, 2012, which is incorporated herein by reference in its entirety.

TECHNICAL FIELD

This specification generally relates to updating vocabularies for speech-based systems.

BACKGROUND

Speech systems depend upon discrete vocabularies of words which form atomic units of recognition results. English dictionaries typically contain no more than one hundred thousand words. However, with proper names, locations, and other non-dictionary words, speech recognition systems typically employ vocabularies ten to one hundred times larger, depending on resource availability and system-specific requirements. These large speech vocabularies, or dictionaries, generally include garbage words of poor quality. Under current systems, speech vocabulary clean up and garbage word removal is performed, in part, by expensive word by word human audits.

SUMMARY

This specification describes technologies relating to system, methods, and articles for updating a speech recognition dictionary based on, at least in part, both search query and market data metrics.

In general, one innovative aspect of the subject matter described in this specification can be embodied in a system comprising one or more computers and a non-transitory computer-readable medium coupled to the one or more computers having instructions stored thereon which, when executed by the one or more computers, causes the one or more computers to perform operations comprising (i) identifying a candidate term for possible inclusion in a speech recognition dictionary, (ii) identifying at least one search query metric associated with the identified candidate term, (iii) identifying at least one market data metric associated with the identified candidate term, and (iv) generating a candidate term score for the identified candidate term based, at least in part, on a weighted combination of the at least one identified search query metric and the at least one identified market data metric. Other embodiments of this aspect include corresponding methods, apparatus, and articles, configured to perform the operations of the system, encoded on non-transitory computer storage devices.

These and other embodiments can each optionally include one or more of the following features. For example, the operations may further comprises identifying a candidate term score minimum threshold associated with the speech recognition dictionary and determining whether the generated candidate term score for the identified candidate term meets or exceeds the candidate term score minimum threshold. In some instances, the identified candidate term is not included within the speech recognition dictionary, and the operations may further comprise adding the identified candidate term to the speech recognition dictionary in response to the determination that the generated candidate term score for the identified candidate term meets or exceeds the candidate term score minimum threshold. In those instances, the operations may also further comprise identifying a term previously included within the speech recognition dictionary corresponding to the relatively lowest candidate term score based on at least one search query metric associated with the previously included term and on at least one market data metric associated with the previously included term, and removing the previously included term from the speech recognition dictionary in response to adding the identified candidate term to the speech recognition dictionary. In some instances, the identified candidate term is not included within the speech recognition dictionary. In those instances, the operations may further comprise rejecting the identified candidate term from addition to the speech recognition dictionary in response to the determination that the generated candidate term score for the identified candidate term does not meet or exceed the candidate term score minimum threshold. When the identified candidate term is previously included within the speech recognition dictionary, the operations may further comprise removing the identified candidate term from the speech recognition dictionary in response to the determination that the generated candidate term score for the identified candidate term does not meet or exceed the candidate term score minimum threshold.

In some instances, the at least one search query metric may include at least one of the following: a query count associated with a number of searches for the candidate term, click information associated with the candidate term, and a time-based search query metric identifying a query count within a predefined period of time. In some instances, the at least one market data metric may include at least one of the following: revenue generated in association with the candidate term, a count of advertising conversions associated with the candidate term, an advertising conversion rate associated with the candidate term, a number of impressions associated with the candidate term, an advertising bid price associated with the candidate term, a number of bids received for the candidate term, and a number of bidders associated with the candidate term. Still further, identifying the candidate term for possible inclusion in a speech recognition dictionary may occur in response to occurrence of a predetermined triggering update event.

In general, another aspect of the subject matter described in this specification can be embodied in a method comprising (i) identifying a candidate term for possible inclusion in a speech recognition dictionary, (ii) identifying at least one search query metric associated with the identified candidate term, (iii) identifying at least one market data metric associated with the identified candidate term, and (iv) generating a candidate term score for the identified candidate term based, at least in part, on a weighted combination of the at least one identified search query metric and the at least one identified market data metric.

In some instances, the method may further comprise identifying a candidate term score minimum threshold associated with the speech recognition dictionary and determining whether the generated candidate term score for the identified candidate term meets or exceeds the candidate term score minimum threshold. Where the identified candidate term is not included within the speech recognition dictionary, the operations may further comprise adding the identified candidate term to the speech recognition dictionary in response to the determination that the generated candidate term score for the identified candidate term meets or exceeds the candidate term score minimum threshold. In those instance, the method may further comprise identifying a term previously included } within the speech recognition dictionary corresponding to the relatively lowest candidate term score based on at least one search query metric associated with the previously included term and on at least one market data metric associated with the previously included term and removing the previously included term from the speech recognition dictionary in response to adding the identified candidate term to the speech recognition dictionary.

Where the identified candidate term is not included within the speech recognition dictionary, the operations may further comprise rejecting the identified candidate term from addition to the speech recognition dictionary in response to the determination that the generated candidate term score for the identified candidate term does not meet or exceed the candidate term score minimum threshold. Where the identified candidate term is previously included within the speech recognition dictionary, the operations may further comprise removing the identified candidate term from the speech recognition dictionary in response to the determination that the generated candidate term score for the identified candidate term does not meet or exceed the candidate term score minimum threshold.

In some instances, the at least one search query metric may include at least one of the following: a query count associated with a number of searches for the candidate term, click information associated with the candidate term, and a time-based search query metric identifying a query count within a predefined period of time. In some instances, the at least one market data metric may include at least one of the following: revenue generated in association with the candidate term, a count of advertising conversions associated with the candidate term, an advertising conversion rate associated with the candidate term, a number of impressions associated with the candidate term, an advertising bid price associated with the candidate term, a number of bids received for the candidate term, and a number of bidders associated with the candidate term. Still further, identifying the candidate term for possible inclusion in a speech recognition dictionary may occur in response to occurrence of a predetermined triggering update event.

In general, another aspect of the subject matter described in this specification can be embodied in an article comprising a computer-readable medium, the computer readable storage medium storing instructions for causing one or more processors to perform operations including (i) identifying a candidate term for possible inclusion in a speech recognition dictionary, (ii) identifying at least one search query metric associated with the identified candidate term, (iii) identifying at least one market data metric associated with the identified candidate term, and (iv) generating a candidate term score for the identified candidate term based, at least in part, on a weighted combination of the at least one identified search query metric and the at least one identified market data metric.

These and other embodiments can each optionally include one or more of the following features. For example, the operations may further comprises identifying a candidate term score minimum threshold associated with the speech recognition dictionary and determining whether the generated candidate term score for the identified candidate term meets or exceeds the candidate term score minimum threshold. In some instances, the identified candidate term is not included within the speech recognition dictionary, and the operations may further comprise adding the identified candidate term to the speech recognition dictionary in response to the determination that the generated candidate term score for the identified candidate term meets or exceeds the candidate term score minimum threshold. In those instances, the operations may also further comprise identifying a term previously included within the speech recognition dictionary corresponding to the relatively lowest candidate term score based on at least one search query metric associated with the previously included term and on at least one market data metric associated with the previously included term, and removing the previously included term from the speech recognition dictionary in response to adding the identified candidate term to the speech recognition dictionary. In some instances, the identified candidate term is not included within the speech recognition dictionary. In those instances, the operations may further comprise rejecting the identified candidate term from addition to the speech recognition dictionary in response to the determination that the generated candidate term score for the identified candidate term does not meet or exceed the candidate term score minimum threshold. When the identified candidate term is previously included within the speech recognition dictionary, the operations may further comprise removing the identified candidate term from the speech recognition dictionary in response to the determination that the generated candidate term score for the identified candidate term does not meet or exceed the candidate term score minimum threshold.

In some instances, the at least one search query metric may include at least one of the following: a query count associated with a number of searches for the candidate term, click information associated with the candidate term, and a time-based search query metric identifying a query count within a predefined period of time. In some instances, the at least one market data metric may include at least one of the following: revenue generated in association with the candidate term, a count of advertising conversions associated with the candidate term, an advertising conversion rate associated with the candidate term, a number of impressions associated with the candidate term, an advertising bid price associated with the candidate term, a number of bids received for the candidate term, and a number of bidders associated with the candidate term. Still further, identifying the candidate term for possible inclusion in a speech recognition dictionary may occur in response to occurrence of a predetermined triggering update event.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

In general, the present disclosure describes a system, method, and apparatus for updating and maintaining a speech recognition dictionary for use in a voice- or speech-based search engine. Over time, the popularity and/or relevance of particular words or phrases may ebb and flow. For instance, new products on the market, or news events, may shape the types of searches performed by users. The present disclosure describes tools and methods for continually updating typically size-restrained speech recognition dictionaries, or vocabularies, which represent a subset of a typically larger search engine term dictionary. For instance, speech recognition dictionaries may be limited to a particular number of terms (or phrases), such as one million words. Generally, the contents of speech recognition dictionaries may be determined, for example, based on text-based and/or speech-based search query metrics, such as which terms are used in search queries most frequently. As most of these dictionaries are generated and populated based on the frequency of corresponding text-based searches, some of the terms may be garbage or unhelpful when viewed in a speech-based search. For example, some words may have no translation, may be commonly misspelled variations of other terms, or may be otherwise difficult to pronounce accurately and consistently in a speech-based search. The pronunciation of some popular or otherwise frequent terms may be manually provided to or corrected in speech recognition systems to ensure the correct pronunciation is available.

The present solution describes various operations and actions that, when performed, can allow the speech recognition dictionary to be updated and maintained not only on search query frequency and other related metrics, but also on at least partial consideration of market data metrics and data associated with the particular search term. For instance, information on not only how popular a term is within a search query, but also how frequently searches using that term are completed (e.g., no modifications to the search term, such as when a typographical error occurs), revenue generated in relation to a particular word (e.g., based on impressions and conversions of advertisements associated with the corresponding terms), as well as other market data, such as information associated with advertiser bidding for placement and impressions of advertisements in connection with a particular phrase or term, to assist in identifying more relevant terms.

The speech recognition dictionary can be updated to include, where possible, the more relevant terms, by calculating a score using an algorithm that considers, at least in part, the query search metrics and the market data metrics. When a new candidate term is considered for addition to the speech recognition dictionary, this candidate term score can be used to compare the candidate term score against one or more of the scores associated with terms already included within the speech recognition dictionary. If the new candidate term has a higher score than those within the dictionary, then the new candidate term can be added, and the lowest scoring term in the dictionary can be removed. If the dictionary is not filled to capacity, only the addition may occur. Still further, the speech dictionary may not be associated with a particular number of terms, but may instead have a score threshold that must be met to be placed into the speech recognition dictionary. If the score meets or exceeds that value, the candidate term can be added. In some instances, terms already within the dictionary can be evaluated on a periodic basis (or in response to a particular trigger or event) to determine if those terms should remain within the dictionary.

When new candidate terms are added to the speech recognition dictionary, the systems and methods described in the present disclosure may trigger a pronunciation analysis in some instances, such as when an initial, or automated pronunciation analysis fails to successfully identify the pronunciation of the candidate term. In those instances, a message, event, or other notification can be sent to a system or individual responsible for correcting or providing manual or more difficult pronunciations.

Figure 1:
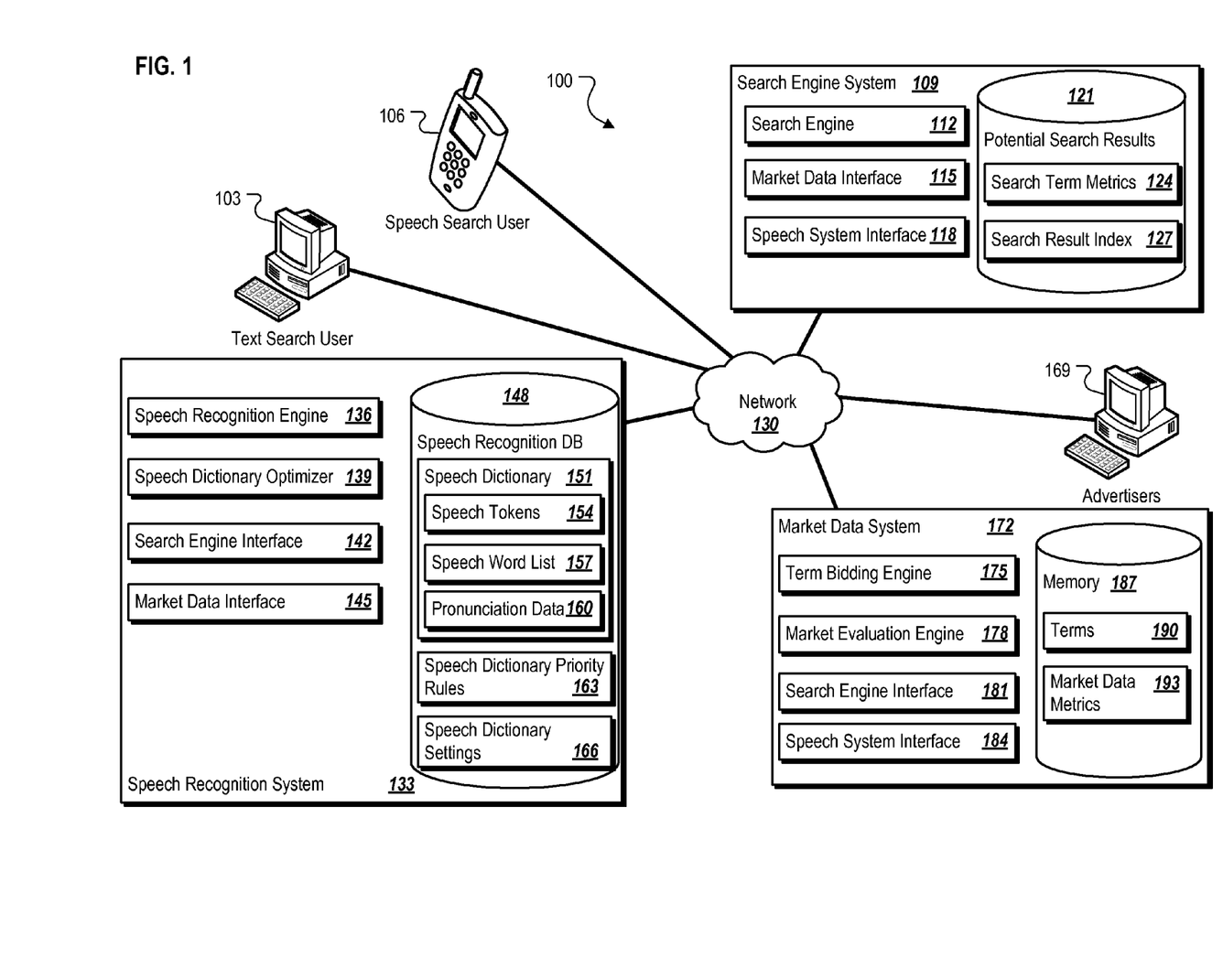
FIG. 1 is a schematic diagram of an example system for receiving and interpreting speech-based searches, and particularly, filtering a speech dictionary based, at least in part, on market data.

FIG. 1 is a schematic diagram of an example system 100 for receiving and interpreting speech-based searches, and particularly, filtering a speech dictionary based, at least in part, on market data. The schematic illustrates an example system 100 incorporating searches from one or more users/devices, whether text-based or speech-based, a search speech recognition systems 133 for interpreting speech-based searches, as well as for modifying a speech recognition dictionary, a search engine system 109 for executing searches, and the search market data system 172, capable of receiving bids for advertisements associated with various keywords, as well as evaluating various market data metrics associated with particular terms and phrases. Communications throughout system 100 can be performed via network 130, as appropriate, as well as through alternative means not illustrated in FIG. 1. The network 130 can include one or more local area networks (LANs), a wide area network (WAN), a wireless local area network (WLAN) or WiFi network, a Third Generation (3G) or Fourth Generation (4G) mobile telecommunications network, a wireless cellular network, a private network such as an intranet, a public network such as the Internet, or any combination thereof. Although illustrated as a single network, network 130 can be a plurality of distinct networks or connections, as appropriate. In general, the users 103 and 106 can communicate with the various components of the illustrated system through network 130. Additionally, the search components—search engine system 109, search speech recognition system 133, and the search market data system 172—can communicate with each other, as well as the users 103 and 106, using the network 130.

In a typical textual search instance, user 103 can input a search query through a web browser or other suitable application or program to the search engine system 109. The search engine system 109, which can incorporate a plurality of computers, servers, and other systems, can receive the textual search query through a web interface with the user's local system. The search engine 112 can identify the search query and determine one or more results responsive to the search query. As illustrated in FIG. 1, the search engine 112 may reference or use a potential search results database or databases 121 to identify responsive documents and web pages, where the databases 121 can include information on various search result indices 127, search results, and other suitable information of assistance in responding to a particular query. The search results can be aggregated, ranked, and returned to the user 103 through a responsive web page or result set. Information on search queries, selected results, and other interactions with the search engine system 109 can be logged and stored within (or associated with) the search engine system 109. As illustrated in FIG. 1, this information can be recorded, captured, and referenced from a set of search term metrics 124. The search term metrics 124 may include search query counts defining how often a particular term or phrase is used within received queries, click information associated with particular terms or phrases detailing how often, when a particular term or phrase is returned after a search query, that term is clicked (or otherwise selected or activated) by users. Generally, this information can assist in providing information on the relevance, importance, and popularity of the corresponding terms and phrases. Additional information included in the set of search term metrics 124 may include additional or alternative signals or information providing additional data on particular search terms and phrases. The data may be raw data for some metrics, while relative data for others. The relative metric data may provide comparisons between two or more search terms or phrases.

The search engine system 109, as illustrated, includes a market data interface 115 and a speech system interface 118. The search engine system 109 can communicate with, and/or share information with and from those particular systems, as well as others. This communication and sharing can allow the systems to provide additional integrated functionality, tools, operations, and data sharing, thereby providing a more robust search experience.

The market data system 172 represents one or more computers and systems that allow for monetization of search systems, as well as tracking of various market data metrics. For example, the market data system 172 may include a term bidding engine 175, which can allow advertisers 169 and users 103, 106, to bid on and sponsor particular terms or phrases 190, such that when a search query is received, an analysis of a potential advertisers' bid on a corresponding keyword associated with the search is performed in combination with a quality score associated with the proposed advertisement of the potential advertiser. The highest combination of those, and other relevant factors, determines which advertisements may be presented. Additional and alternative types of advertisement placement relative to the particular terms or phrases may also be used via the term bidding engine 175. When search queries are received and the analysis on which advertisements are to be presented is made, the market data system 172 can determine the cost to the advertiser of the presented advertisements, and can prepare to charge to or deduct from the advertiser's respective account. Information on the revenue received for particular terms and phrases 190, including the levels of bidding activity and other relevant information, can be stored in the set of market data metrics 193 illustrated in memory 187 of FIG. 1. The market data system 172 can also (e.g., using the market evaluation engine 178) determine, calculate, store, or reference additional market data metrics 193, including a count of advertising conversions associated with particular terms or phrases, an advertising conversion percentage rate associated with the term (e.g., based on the times an advertisement associated with the term or phrase is accessed, clicked on, or otherwise activated or interacted with), and a number of impressions associated with the particular term or phrase, among others. Other features and metrics that may be used to estimate the relative or raw importance, popularity, or rating of a particular term or phrase may include a bid price or prices associated with the term or phrase, a number of bids received for the term or phrase, and the number of bidders for the term or phrase, as well as other suitable information.

The market data system 172 further includes a search engine interface 181 and a speech system interface 184. These interfaces can be implemented in any suitable format (i.e., hardware, software, or any suitable combination thereof), and can allow the market data system 172 to communicate and interact with the corresponding systems. In the illustrated example, the market data included can be accessed and used by the other systems in preparing a response set of search results, as well as in determining a set of terms and phrases to be included in a speech recognition-related dictionary or vocabulary.

Turning now to a speech-based search, a speech search user 106 can input speech input, or other suitable vocal or sound-based input, into web search interfaces included in or associated with mobile applications or apps on mobile devices, web pages, desktop applications, or other programs. In some instances, speech-based searches can be directed initially to a speech recognition system 133, where the speech input is analyzed to determine the corresponding textual input. Alternative sound-based search input can be sent, where appropriate, to alternative search entry points for analysis.

A speech recognition engine 136 can be used by the system 133 to parse the spoken words to determine the actual query spoken. To determine the speech input associated with a search, the speech recognition system 133 can include a speech recognition database 148 that stores a speech recognition dictionary 151. The speech recognition dictionary 151 stores and/or references data and other information used to determine a plurality of terms or phrases that can be interpreted and understood by the speech system and converted into input provided to the search engine 112.

As illustrated in the example environment 100 of FIG. 1, the speech dictionary 151 can include a set of speech tokens 154, a speech word list 157, and a set of pronunciation data 160. The speech tokens 154 represent a set of speech-related sounds that can be combined to identify or create the pronunciation of various words, terms, or phrases. Individual speech tokens 154 can be reused within the system 133 to create the pronunciation of multiple terms and phrases. The speech word list 157 represents a set of understood or understandable words and phrases within the system 133. Due to memory and speed limitations, the speech word list 157 may be smaller than a standard word dictionary included within or associated with the search engine system 109, and in some cases may be limited to a predefined size or number of different words or phrases. The contents of the speech word list 157 may vary or may be revised on a frequent basis in response to continued reevaluation and analysis of particular rules and criteria for inclusion within the list 157. The size of the speech word list 157, as well as a determination on how often the list may be updated or a corresponding analysis performed, may be defined within a set of speech dictionary settings 166. The speech dictionary settings 166 can be managed from within the speech recognition system 133, as well as remotely by one or more administrators. Various other settings associated with the speech dictionary can be defined and/or updated within these settings 166.

As described above, the contents of the speech dictionary 151 can be reevaluated on a continuing basis. The reevaluation of the speech dictionary 151 may include identifying new terms or phrases to be added to the speech dictionary 151, as well as new terms to be removed from the speech dictionary 151, and may be performed, for example, by the speech dictionary optimizer 139. The speech dictionary optimizer 139 can interpret and apply the speech dictionary settings 166, as well as the speech dictionary priority rules 163 associated with evaluating potential new candidate terms and phrases and existing terms and phrases within the speech dictionary 151. New terms may be identified in response to an increased number of search queries for a particular term or phrase as identified by the search term metrics 124 observed or recorded by the search engine system 109. Additionally, new terms may be identified, at least in part, on market data metrics 193 identified by the market data system 172. In some instances, at least one market data metric 193 may be included within a particular algorithm to generate rankings or scores among the candidate word that is being evaluated for possible inclusion within the speech dictionary 151, and some or all of the terms or phrases that are already included within the speech dictionary 151. The speech dictionary optimizer 139 can use the illustrated search engine interface 142 and the market data interface 145 to access and retrieve information associated with those corresponding systems.

As size limitations of the speech dictionary 151 may limit the number of terms or phrases therein, when a new candidate term or phrase exceeds a particular threshold score, in some instances, one or more of the lowest ranking terms or phrases from within the speech dictionary 151 may be removed. In some instances, the speech dictionary 151 may have some flexibility in its size, such that candidate terms meeting a particular score threshold may be added without removing an existing term or phrase from the speech dictionary 151. These rules can be determined by referencing the rules and settings within either the speech dictionary settings 166 or the speech dictionary priority rules 163. In general, the speech dictionary priority rules 163 can define or identify the particular algorithm used to implement the evaluation of candidate terms or phrases and/or the evaluation of the existing terms or phrases within the speech dictionary 151. In some instances, the speech dictionary priority rules 163 may be associated with certain alternative threshold scores that define when a term or phrase should have its pronunciation double-checked, such as when a particular term or phrase has a substantially high score. This can help ensure that the most popular and important terms or phrases within the speech dictionary 151 and speech word list 157 have accurate pronunciations.

Returning to the speech search process, the speech recognition engine 136 can interpret the incoming speech search input, comparing the received speech to the speech dictionary 151 to determine the best estimation of what is represented by the speech input. The speech recognition engine 136 can then provide the textual version of the search to the search engine 112 via the search engine interface 142, where a set of search results responsive to the converted speech-based search query. Those results can be returned to the speech search user 106, who can then view the results similar to a traditional search experience. If the speech recognition engine 136 cannot determine the speech input, an appropriate notification can be provided to the speech search user 106 to note that the speech was not understood, to resubmit the speech input, or to recommend alternative search query entry, where appropriate. Various alternative search-related operations can be executed during the speech-based search, such as algorithms used to provide guesses and corrections to unclear or not understood speech input.

Figure 2:
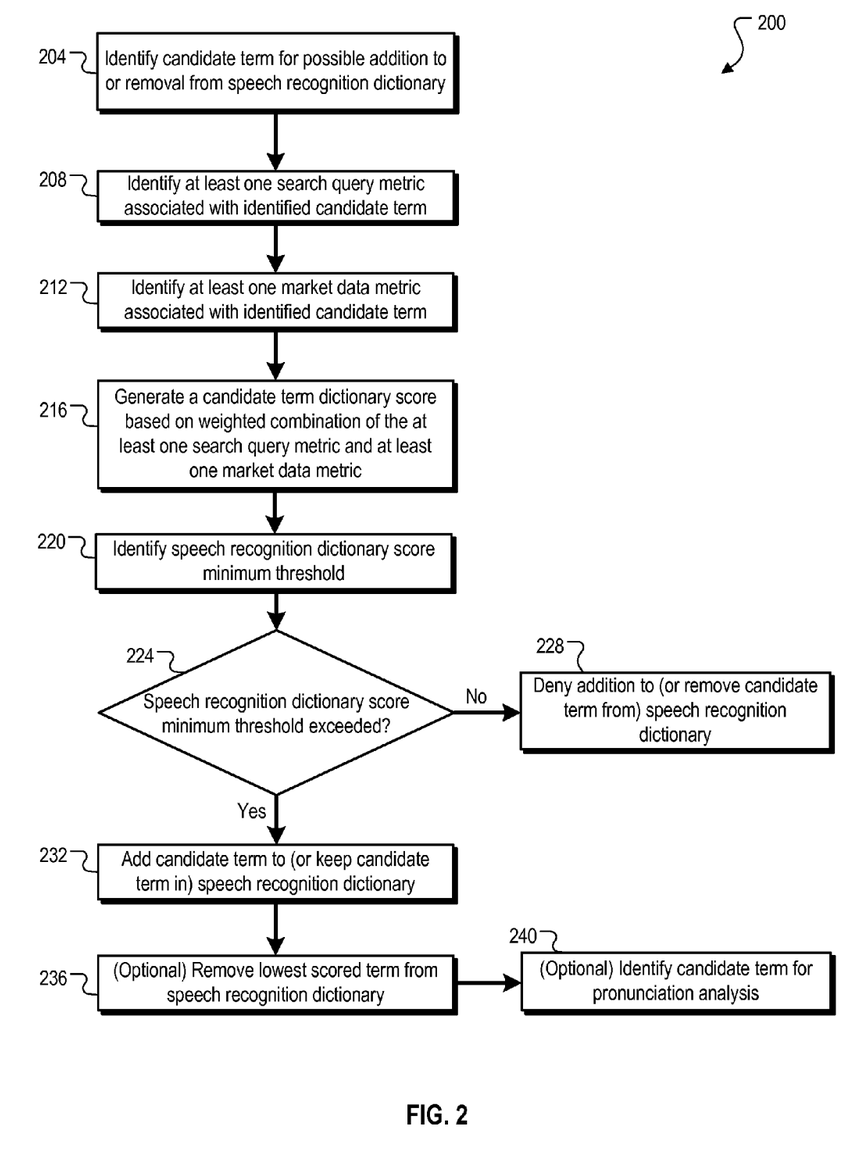
FIG. 2 is a flowchart of an example method for modifying and/or updating a speech recognition dictionary in response to identification of new candidate terms, using at least one search query metric and at least one market data metric to generate a candidate term score to compare against a plurality of existing terms or phrases within the speech dictionary.

FIG. 2 is a flowchart of an example method 200 for modifying and/or updating a speech recognition dictionary in response to identification of new candidate terms, using at least one search query metric and at least one market data metric to generate a candidate term score to compare against a plurality of existing terms or phrases within the speech dictionary. For clarity of presentation, the description that follows generally describes method 200 in the context of system 100 illustrated in FIG. 1. However, it will be understood that method 200 can be performed, for example, by another system, environment, or combination of systems and environments.

At 204, a candidate term for possible addition to or removal from the speech recognition dictionary is identified. Identifying the candidate term may be based on a manual identification or indication by an administrator associated with the speech recognition system. In some instances, new candidate terms may be automatically identified based on a plurality of algorithms, including algorithms analyzing or identifying terms or phrases reaching a particular threshold of text-based requests. In other instances, potential candidate terms may be identified based on a certain number of speech search requests or queries received for the term or phrase. When the candidate term or phrase is not already included within the speech dictionary, the speech recognition dictionary may not be able to complete the previously-submitted speech search queries. Generally, a term or phrase missing from the vocabulary is difficult to recognize, as the term or phrase may be misrecognized or may be provided a low-scoring speech recognition result. What may be identifiable, however, is the fact that users and searches do not click on associated results with a particular term or phrase, such that the potential of using failed search queries as a possible identifier or signal to involve human interaction with a particular term or phrase. However, a recording of the particular failed request may be stored and/or provided to a transcriber or translator who can identify the term or phrase associated with the failed request. When a predetermined number of failed terms are received or identified, the associated term or phrase can be added to a queue of potential candidate terms. Alternatively, terms or phrases may be identified in response to identification or notification from a market data system, such as when a term or phrase is associated with a predetermined or unusual amount of interest or increased market data metrics. For example, in response to a large winter storm, the term "Snowmaggeden" may be associated with increased ad-related bidding or auctions, such that the market data system can identify the term "Snowmaggeden" as a possible candidate term for inclusion within the speech recognition system. Additional and alternative means of identifying potential candidate terms may be used in various implementations of the present disclosure, and the examples included herein are not mean to be exclusive.

At 208, at least one search query metric associated with the identified candidate term can be identified. In some instances, the speech recognition system can retrieve relevant search query metrics associated with the term from a search engine-related system, such as the search engine system 109 described in FIG. 1. The search query metrics may include, but are not limited to, a query count associated with a number of searches for the candidate term or click information associated with the candidate term, as well as other suitable information. Additionally, one or more of the identified search query metrics may be associated with a particular time period (e.g., search queries within the last month or other time periods used to determine recent and popular topics) to provide an up-to-date and current speech recognition dictionary.

At 212, at least one market data metric associated with the identified candidate term is identified. In some instances, the speech recognition system can retrieve or access relevant market data metrics from a market data system or other suitable location, such as the market data system 172 illustrated in FIG. 1. The market data metrics may include revenue generated in association with the candidate term, a count of advertising conversions associated with the candidate term, an advertising conversion rate associated with the candidate term, and a number of impressions associated with the candidate term, among other suitable metrics and market data, including, but not limited to, those previously described. Additionally, one or more of the identified market data metrics may be associated with a particular time period (e.g., revenue generated within the last month) to provide an up-to-date and current speech recognition dictionary.

At 216, a candidate term dictionary score or percentage can be calculated or generated based on a weighted combination of the at least one identified search query metric and the at least one identified market data metric. Any suitable algorithms may be applied to calculate the score or percentage, and additional signals, data, and metrics other than the at least one identified search query metric and the at least one identified market data metric may be used to arrive at the score to be used. If multiple search query metrics and/or multiple market data metrics are identified, various metrics may be provided different weights or importance. For example, the search query count for a particular term may be provided a higher weight than the number of another search query metric. Similarly, the revenue generated by or associated with a particular term may be weighted higher than another market data metric. Still further, the weight provided to the search query metrics may be provided may be higher than the weight provided to the market data metrics.

At 220, the speech recognition dictionary score minimum threshold is identified. In some instances, the minimum threshold may correspond to the score associated with the lowest ranked term or phrase already included in the speech recognition dictionary. In other instances, the minimum threshold may correspond to a particular score or value which terms (both candidate terms or phrases and existing terms or phrases in the speech recognition dictionary) must meet in order to be included or remain within the speech recognition dictionary. In some instances, the minimum threshold may be defined by a set of speech recognition dictionary settings.

At 224, a determination is made as to whether the generated candidate term dictionary score exceeds, meets, or fails to exceed the identified minimum threshold. If the minimum threshold is not met, method 200 continues at 228, where the candidate term is denied addition to the speech recognition dictionary (if it was not previously included in the dictionary) or removed from the speech recognition dictionary (where the candidate term was already included in the dictionary). If, however, the minimum threshold is met, method 200 continues at 232, where the candidate term is added to or retained within the speech recognition dictionary (depending on whether the candidate term is new to the dictionary or already included therein).

At 236, an optional operation of removing the lowest scored term from the speech recognition dictionary may be performed. The removal may be based on settings associated with the speech recognition dictionary, such as whether the speech recognition dictionary is to be kept at a particular number of entries or size, or whether a buffer exists to allow flexibility in the size of the speech recognition dictionary. If the speech recognition dictionary is populated with terms and phrases that exceed an arbitrary or predetermined score, the lowest scored term may not need to be removed.

In some instances, determining that a particular candidate term is to be added to the speech recognition dictionary may trigger an operation (240) to identify the candidate term for a pronunciation analysis or determination. The analysis may be automated or manually performed, and can associate a particular pronunciation(s) to the term or phrase to allow incoming speech search queries for the term or phrase to be successfully completed.

Figure 3:
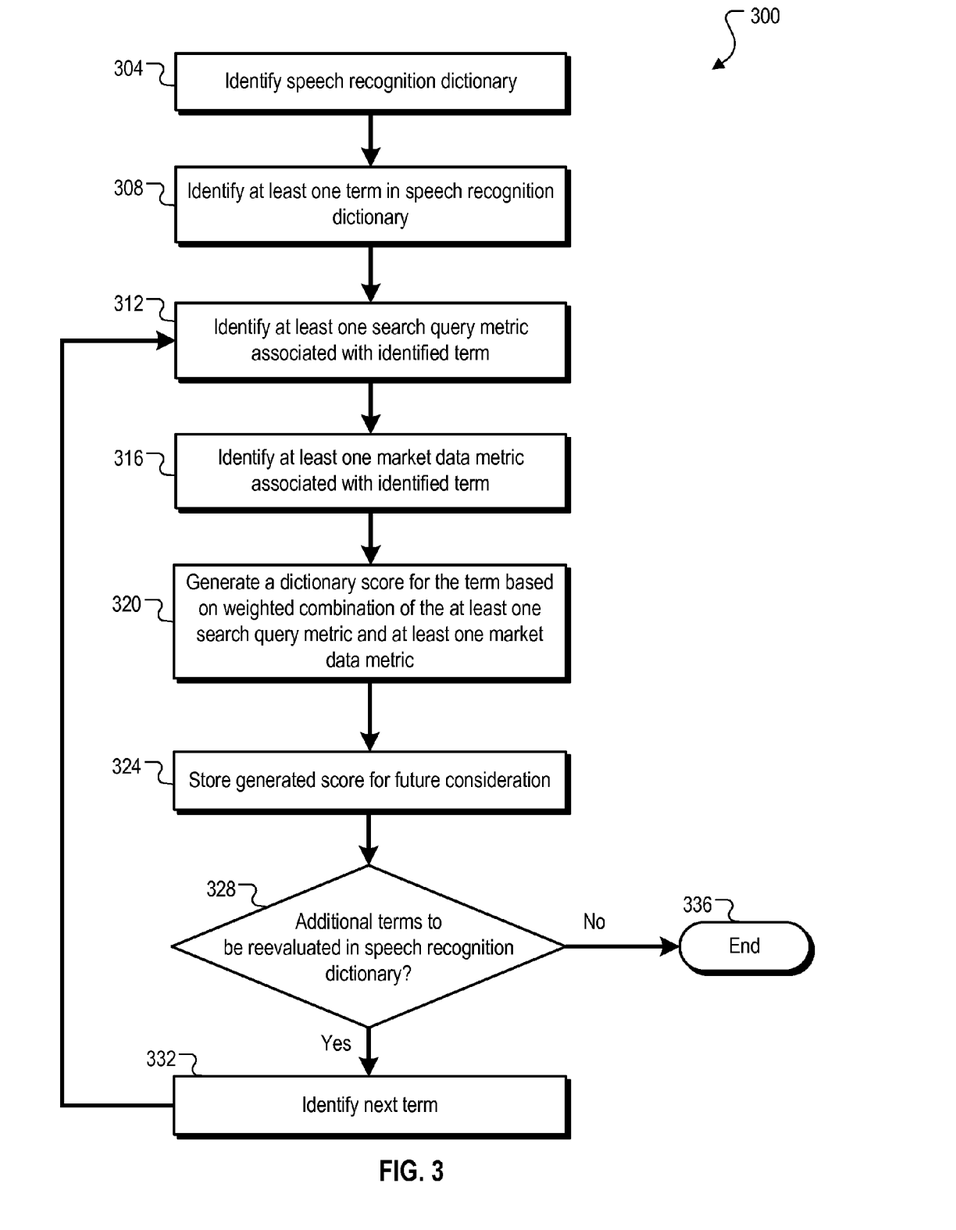
FIG. 3 is a flowchart of an example method for updating term scores associated with terms and phrases included within a speech recognition dictionary, where the term scores are based, at least in part, on at least one search query metric and at least one market data metric.

FIG. 3 is a flowchart of an example method for updating term scores associated with terms and phrases included within a speech recognition dictionary, where the term scores are based, at least in part, on at least one search query metric and at least one market data metric. In order to compare candidate terms to the speech recognition dictionary, the terms and phrases within the speech recognition dictionary must be reevaluated on a regular basis to ensure that their continued inclusion within the speech recognition dictionary is proper. In some instances, the existing terms or phrases may be run through a process similar to that of method 200, while in others, the scores of the existing terms may be regenerated for future use. For clarity of presentation, the description that follows generally describes method 300 in the context of system 100 illustrated in FIG. 1. However, it will be understood that method 300 can be performed, for example, by another system, environment, or combination of systems and environments.

At 304, the speech recognition dictionary is identified. In some instances, multiple speech recognition dictionaries may exist to serve searches and input from different locations and/or languages. The speech recognition dictionary to be updated can be identified in response to a manual selection or indication, a predetermined maintenance schedule, or in response to a triggering event. At 308, at least one term included within the identified speech recognition dictionary is identified. The first term may be identified based on its alphabetical position within the dictionary, its relative ranking within the dictionary, or any other suitable identification means. In some instances, the determination may be based on the date of the last evaluation of the particular term or phrase.

At 312 and 316, respectively, at least one search query metric and at least one market data metric are identified. These metrics can be identified in a similar or different operation than that described with regard to 208 and 212 of method 200. At 320, a dictionary score or percentage is generated or calculated for the identified term or phrase based at least in part on the weighted combination of the at least one identified search query metric and the at least one identified market data metric. In some instances, the prior score or scores of the identified term or phrase may be considered in generating the updated dictionary score. By considering at least some historical information, the turnover of and modifications to the speech recognition dictionary may occur at a more manageable rate, lessening the possibility of severe fluctuations in rankings. Once the score is generated, the value can be stored (at 324) in an appropriate location for future considerations and comparison with new candidate terms.

At 328, a determination is made as to whether additional terms or phrases within the speech recognition dictionary are to be reevaluated. If no additional terms or phrases are to be reevaluated, method 300 ends at 336. If, however, additional terms or phrases are to be reevaluated, method 300 identifies the next term to be considered at 332. Method 300 then returns to 312, where the associated metrics for that new term are identified and a new score is generated.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them, where some or more can be non-transitory. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices). In some instances, the computer readable medium can be a non-transitory and/or tangible computer readable medium.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, application, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory, or both. The essential elements of a computer are a processor for performing actions in accordance with instructions and one or more memory devices for storing instructions and data. Generally, a computer will also include, or be operatively coupled to receive, data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user, as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server. Further, the computing system can include actions performed via a cloud-based computing system implementing a cloud architecture. A cloud architecture can include multiple cloud components communicating with each other through application programming interfaces (APIs), such as web services. A front end of the system can be presented to clients, and can include the client's network or computer, as well as the applications used to access the cloud-based computing system, such as a web browser. The back end of the cloud-based computing system can include various different computers, servers, and data storage devices performing the operations associated with the system.

While this specification contains many specific implementation details, these should not be construed as limitations on the scope of what can be claimed, but rather as descriptions of features specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination. One example alternative implementation may include the use of different speech recognition vocabularies and/or dictionaries. For example, one example solution may include a primary vocabulary associated with the search terms and phrases used over the last year, a secondary vocabulary or dictionary that consists of a user's contacts, and a tertiary vocabulary or dictionary that consists of rising and/or hot topics. The different dictionaries could be updated at different intervals, with the hot topic dictionary being updated on an hourly, daily, or weekly basis (or other suitable times), while the primary dictionary may be updated every two or three weeks, as needed. This can improve update times Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
   one or more computers; and
   a computer-readable medium coupled to the one or more computers having instructions stored thereon which, when executed by the one or more computers, cause the one or more computers to perform operations comprising:
   identifying a candidate term for possible inclusion in a speech recognition dictionary;
   identifying at least one search query metric associated with the identified candidate term;
   identifying at least one market data metric associated with the identified candidate term; and
   generating a candidate term score for the identified candidate term based, at least in part, on a weighted combination of the at least one identified search query metric and the at least one identified market data metric.

2. The system of claim 1, the operations further comprising:
   identifying a candidate term score minimum threshold associated with the speech recognition dictionary; and
   determining whether the generated candidate term score for the identified candidate term meets or exceeds the candidate term score minimum threshold.

3. The system of claim 2, where the identified candidate term is not included within the speech recognition dictionary, the operations further comprising:
   adding the identified candidate term to the speech recognition dictionary in response to the determination that the generated candidate term score for the identified candidate term meets or exceeds the candidate term score minimum threshold.

4. The system of claim 3, the operations further comprising:
   identifying a term previously included within the speech recognition dictionary corresponding to the relatively lowest candidate term score based on at least one search query metric associated with the previously included term and on at least one market data metric associated with the previously included term; and
   removing the previously included term from the speech recognition dictionary in response to adding the identified candidate term to the speech recognition dictionary.

5. The system of claim 2, where the identified candidate term is not included within the speech recognition dictionary, the operations further comprising:
   rejecting the identified candidate term from addition to the speech recognition dictionary in response to the determination that the generated candidate term score for the identified candidate term does not meet or exceed the candidate term score minimum threshold.

6. The system of claim 2, wherein the identified candidate term is previously included within the speech recognition dictionary, the operations further comprising:
   removing the identified candidate term from the speech recognition dictionary in response to the determination that the generated candidate term score for the identified candidate term does not meet or exceed the candidate term score minimum threshold.

7. The system of claim 1, wherein the at least one search query metric includes at least one of the following: a query count associated with a number of searches for the candidate term, click information associated with the candidate term, and a time-based search query metric identifying a query count within a predefined period of time.

8. The system of claim 1, wherein the at least one market data metric includes at least one of the following: revenue generated in association with the candidate term, a count of advertising conversions associated with the candidate term, an advertising conversion rate associated with the candidate term, a number of impressions associated with the candidate term, an advertising bid price associated with the candidate term, a number of bids received for the candidate term, and a number of bidders associated with the candidate term.

9. The system of claim 1, wherein identifying the candidate term for possible inclusion in a speech recognition dictionary occurs in response to occurrence of a predetermined triggering update event.

10. A computer-implemented method performed by one or more processors, the method comprising:
    identifying, by at least one processor, a candidate term for possible inclusion in a speech recognition dictionary;
    identifying, by at least one processor, at least one search query metric associated with the identified candidate term;
    identifying at least one market data metric associated with the identified candidate term; and
    generating, by at least one processor, a candidate term score for the identified candidate term based, at least in part, on a weighted combination of the at least one identified search query metric and the at least one identified market data metric.

11. The method of claim 10, further comprising:
    identifying a candidate term score minimum threshold associated with the speech recognition dictionary; and
    determining whether the generated candidate term score for the identified candidate term meets or exceeds the candidate term score minimum threshold.

12. The method of claim 11, where the identified candidate term is not included within the speech recognition dictionary, the operations further comprising:
    adding the identified candidate term to the speech recognition dictionary in response to the determination that the generated candidate term score for the identified candidate term meets or exceeds the candidate term score minimum threshold.

13. The method of claim 12, further comprising:
    identifying a term previously included within the speech recognition dictionary corresponding to the relatively lowest candidate term score based on at least one search query metric associated with the previously included term and on at least one market data metric associated with the previously included term; and
    removing the previously included term from the speech recognition dictionary in response to adding the identified candidate term to the speech recognition dictionary.

14. The method of claim 11, where the identified candidate term is not included within the speech recognition dictionary, the operations further comprising:
    rejecting the identified candidate term from addition to the speech recognition dictionary in response to the determination that the generated candidate term score for the identified candidate term does not meet or exceed the candidate term score minimum threshold.

15. The method of claim 11, wherein the identified candidate term is previously included within the speech recognition dictionary, the operations further comprising:
    removing the identified candidate term from the speech recognition dictionary in response to the determination that the generated candidate term score for the identified candidate term does not meet or exceed the candidate term score minimum threshold.

16. The method of claim 10, wherein the at least one search query metric includes at least one of the following: a query count associated with a number of searches for the candidate term, or click information associated with the candidate term, and a time-based search query metric identifying a query count within a predefined period of time.

17. The method of claim 10, wherein the at least one market data metric includes at least one of the following: revenue generated in association with the candidate term, a count of advertising conversions associated with the candidate term, an advertising conversion rate associated with the candidate term, and a number of impressions associated with the candidate term, an advertising bid price associated with the candidate term, a number of bids received for the candidate term, and a number of bidders associated with the candidate term.

18. An article of manufacture comprising a computer-readable storage device, the computer readable storage device storing instructions that are operable, when executed by one or more computers, to cause the one or more computers to perform operations comprising: identifying a candidate term for possible inclusion in a speech recognition dictionary;
    identifying at least one search query metric associated with the identified candidate term;
    identifying at least one market data metric associated with the identified candidate term; and
    generating a candidate term score for the identified candidate term based, at least in part, on a weighted combination of the at least one identified search query metric and the at least one identified market data metric.

19. The article of claim 18, the operations further including:
    identifying a candidate term score minimum threshold associated with the speech recognition dictionary; and
    determining whether the generated candidate term score for the identified candidate term meets or exceeds the candidate term score minimum threshold.

20. The article of claim 19, where the identified candidate term is not included within the speech recognition dictionary, the operations further comprising:
    adding the identified candidate term to the speech recognition dictionary in response to the determination that the generated candidate term score for the identified candidate term meets or exceeds the candidate term score minimum threshold.

* * * * *